March 22, 1949.  E. WILDHABER  2,464,914
METHOD OF CUTTING TOOTHED CLUTCHES AND COUPLINGS
Filed Aug. 30, 1945  2 Sheets-Sheet 1

ERNEST WILDHABER
INVENTOR.

BY

March 22, 1949.  E. WILDHABER  2,464,914
METHOD OF CUTTING TOOTHED CLUTCHES AND COUPLINGS
Filed Aug. 30, 1945  2 Sheets-Sheet 2

INVENTOR.
ERNEST WILDHABER
BY

Patented Mar. 22, 1949

2,464,914

UNITED STATES PATENT OFFICE 2,464,914

METHOD OF CUTTING TOOTHED CLUTCHES AND COUPLINGS

Ernest Wildhaber, Brighton, N. Y., assignor to Gleason Works, Rochester, N. Y., a corporation of New York Application August 30, 1945, Serial No. 613,550

5 Claims. (Cl. 90—9.4)

The present invention relates to the cutting of toothed face members such as face couplings and clutches. In a more particular aspect, it relates to the finish-cutting from the solid in one operation of toothed face members whose opposite side surfaces are either both longitudinally convex or longitudinally concave.

In the cutting of toothed face members of the character specifically referred to, it is the practice to use a face mill cutter and cut opposite side tooth surfaces of the work simultaneously by positioning the cutter relative to the work so that it operates simultaneously in two spaced toothed zones of the work, and rotating the cutter in engagement with the work, while effecting relative depthwise feed movement between the cutter and work. Then the cutter is withdrawn from engagement with the work and the work indexed. The side-cutting edges of the cutter usually are all inside-cutting edges or all outside-cutting edges depending on whether opposite sides of the teeth of the work are to be of longitudinally convex or of longitudinally concave shape.

With this cutting method, during the first several cycles of cutting the cutter cuts into the solid blank in both zones of its engagement with the work. Then for several cutting cycles, it cuts into solid stock in only one zone of engagement while in the other zone of engagement it is cutting into a tooth space, one side of which has previously been cut. Then for the rest of the cutting cycles until the work is finished, the cutter cuts in both cutting zones into two tooth spaces, one side of each of which has previously been cut.

Heretofore, the cutters used have had their side-cutting edges, inside or outside, arranged at the same radial distance from the axis of the cutter and all of the side-cutting edges have had to do substantially the same amount of work. Moreover, the direction of depthwise feed of the cutter into the work has been such that, where the cutter was cutting from the solid, the burden of removing stock from a tooth space of the work during the feed motion has fallen on the side-cutting edges of the cutter as much or even more than on the tip-cutting edges.

With the cutters heretofore used, then, and with the conventional method of employing these cutters, it is obvious that the loads on the cutter not only vary in the two cutting zones during several of the cutting cycles but that the loads on the cutter vary, also, differently at different times during the complete cutting operation. This makes it difficult to obtain, when cutting toothed face members of the character described from the solid, the high degree of accuracy of tooth spacing which is desirable. Moreover, the side-cutting edges of the cutter are liable to dull during the cutting process with the result that the same desired smoothness of finish can not be obtained on all of the teeth of the coupling or clutch member.

The primary object of the present invention is to provide a method for cutting toothed face members of the character described in which the utmost accuracy in tooth shape and tooth spacing can be obtained even when the clutch or coupling members are finished in one operation from the solid.

A further object of the invention is to provide an improved method for cutting toothed face clutch members from the solid which will permit of producing a finer finish on the sides of the teeth of the work than obtainable with any prior process of cutting such members from the solid, and a finish comparable to or even better than that which is obtained where the work is first rough-cut and then subsequently finish-cut in a separate operation.

Other objects of the invention will be apparent hereinafter from the specification and from the recital of the appended claims.

With the present invention, a face mill cutter is employed that has side-cutting edges at both sides and that has some of its cutting edges at the side, which is to do the finish-cutting, projecting laterally beyond the rest of the cutting edges at that side of the cutter. The cutter is fed relatively depthwise into the work so that, during the depthwise feed, cutting is done largely by the tip-cutting edges of the cutter and by the side-cutting edges at the non-finishing side of the cutter. After the cutter has reached full depth, it is allowed to dwell there long enough for the laterally projecting side-cutting edges at the finishing side of the cutter to finish-cut without any depthwise cutting being done. Then the cutter is withdrawn from engagement with the work and the work is indexed. Then the cycle begins anew. The rotation of the cutter is timed to the cycle of operation so that the cutter will always make the same number of revolutions per cutting cycle and all the sides of the teeth of the work will be finished alike.

Since cutting during the depthwise feed is largely done with this invention by the tip-cutting edges and by the side-cutting edges at the non-finishing side of the cutter, the finishing-cutting edges are prevented from dulling during the cutting of a workpiece and will produce a fine finish. Furthermore, since finish-cutting on the tooth sides takes place in each tooth space after the cutter has reached full depth and while no cutting in the tooth space bottom is being done, thrusts, which might cause inaccuracy in tooth spacing, are avoided, and all teeth are spaced alike.

In the drawings:

Figs. 1 to 4 inclusive are sectional views taken in the pitch plane of the work and illustrating diagrammatically different successive stages in the operation of cutting a toothed face member with longitudinally convex tooth sides whether by conventional practice or according to the improved method of the present invention;

Figure 1:
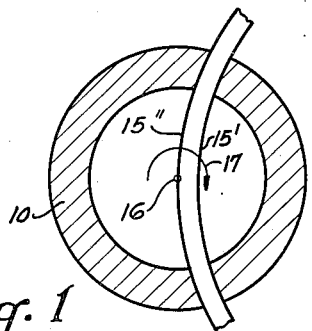

Figs. 1 to 4 inclusive illustrate the cutting from the solid of one member 10 of a toothed face clutch or coupling. This member has teeth 11 whose opposite sides 12 and 13 are longitudinally convex. In cutting this member according either to prior practice or according to the present method with a face mill cutter, the cutter is positioned to operate in two spaced tooth zones of the work simultaneously. Fig. 1 illustrates the first step in the cutting of the clutch or coupling member. Here the rotating cutter is fed into a solid blank, and in both of its zones of engagement with the work, it cuts into the solid. The lines 15' and 15" denote the path of the cutter as it travels through the work during this stage of the operation.

After the cutter has reached full depth and completed its cuts, it is withdrawn from engagement with the work, and the work is indexed by rotation about its axis 16. Then the cutter is fed anew into the work to cut into two new tooth spaces of the work. The feed of the rotating cutter into the work to full depth position, the withdrawal of the cutter from the work after completion of its cuts, and the indexing of the work after withdrawal of the cutter constitute what is known as the cutting cycle. The indexing rotation of the work may be in either direction. In the instance shown, the work is indexed clockwise, that is, in the direction of the arrow 17.

During the first several cutting cycles the cutter will cut into the solid blank in both zones of engagement. When the work has been indexed into the position shown in Fig. 2, however, in one tooth zone the cutter will cut into a tooth space 18a, one side 13a of which has already been completed in a previous cutting cycle, but in the other tooth zone it will still cut into solid stock. The load on the cutter in its two zones of engagement with the work will at this stage of cutting, therefore, be unbalanced and diminished.

During some further cutting cycles, the cutter will continue to cut into the solid blank in one zone of its engagement and into a previously partially-cut tooth space in the other zone of its engagement. But when the work has been indexed into the position shown in Fig. 3, the cutter will cut into two tooth spaces 18b and 18c which have previously been partially cut. From this point on to completion of the last pair of tooth sides, which is the stage shown in Fig. 4, the cutter will operate, in both zones of cutting engagement, in tooth spaces that have been previously partially cut.

Figure 2:
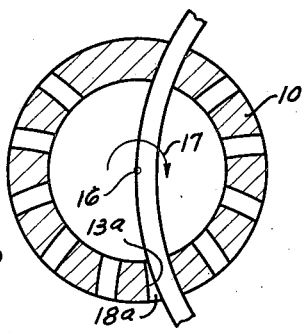
Figure 3:
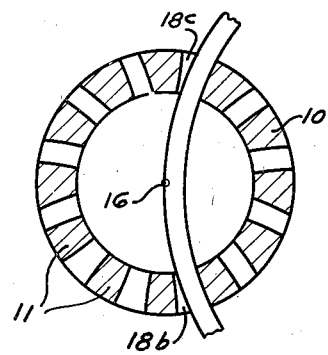
Figure 4:
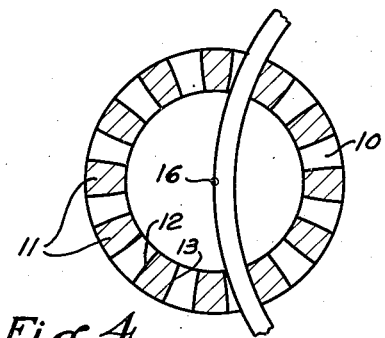

In the conventional method of cutting a toothed face member, such as the member 10 with double-longitudinally convex tooth sides, a face mill cutter is used that finishes with its inside cutting blades. For cutting a mating member having double longitudinally concave tooth sides, a face mill cutter that finishes with its outside cutting blades, is used. In both cases, the side-cutting edges and the tip-cutting edges of the cutter remove the stock from the tooth spaces of the work during the in-feed of the cutter into the work and opposite sides of spaced tooth spaces are completed when the cutter has reached full depth position.

Where the load varies at different stages of the operation, as it does, difficulty is encountered in maintaining accuracy of tooth spacing. This difficulty is aggravated at those stages of the operation, such as illustrated in Fig. 2, where the cutter is cutting into the solid in one zone of its engagement and into a previously partially-cut tooth space in the other zone of its engagement. Further, where the side-cutting edges, which are intended to finish the tooth sides, are required to remove the stock also, as has been the case in prior practice, it is difficult to obtain as smooth a finish as is desired on the sides of the teeth of the work.

Figure 5:
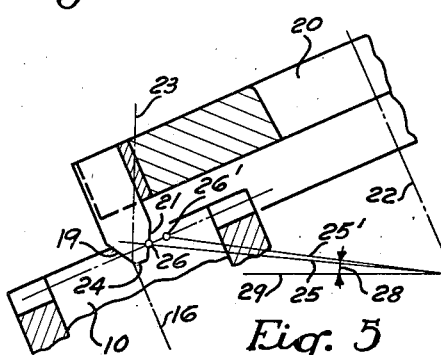
Fig. 5 is a sectional view taken at right angles to the views of Figs. 1 to 4 inclusive and illustrating diagrammatically one embodiment of the present invention as applied to the cutting of toothed face members of convex lengthwise side tooth shape and positive pressure angle.

Fig. 5 shows how the present invention may be applied to the cutting of the toothed member 10. Here a face-mill cutter 20 is employed that has inside finish-cutting edges 21, outside cutting edges 19, and tip-cutting edges 24. The outside and inside cutting edges may be on the same blades but preferably are provided on separate blades.

In cutting the side tooth surfaces of the member 10 by the present invention, the cutter 20 is rotated on its axis 22 while depthwise feed is effected between the cutter and the work in a direction such as denoted by line 23, which is so inclined to the axis 16 of the work that during the feed only a light cut will be taken by the inside cutting edges 21. The depthwise feed may be continuous and at a constant rate.

The normal 25 to the cutting surface 21 of the cutter at mean point 26 intersects the cutter axis 22 in a point 27. The cutting surface referred to is the continuous surface in which all of the inside-cutting edges of the cutter lie. At a mean point along a longitudinally convex tooth side being cut by the inside-cutting edge, the normal to the cutting surface 21 has the position 25' and is inclined at a small positive pressure angle 28 to a plane 29 perpendicular to the direction 23 of depthwise feed. If the angle 28 is about six degrees, the sine of this angle is about 0.1, and the thickness of the chip to be removed from the longitudinally convex side of the tooth space is about one tenth of the thickness of chip in the direction 23 of depthwise feed. The normal thickness of the chip removed by the tip-cutting edge 24 of the cutting blade is then about nine tenths of the thickness of the chips in the direction 23 of feed and about nine times larger than the thickness of the chips cut by the inside-cutting edges 21 of the cutter during the depthwise feed. Thus, the thickness of the chips taken by the inside-cutting edges of the blades during depthwise feed in direction 23 is only 0.0001 inch when the thickness of the chips taken by the tips of the blade is .0009 inch, and it is only 0.0005 inch when the thickness of the chip taken by the tip-cutting edges 24 of the blades is 0.0045 inch. Thus, it will be seen that the inside-cutting edges of the blades may be relieved by the depthwise feed in the direction 23 of most of the burden of cutting, which will then fall upon the outside and tip-cutting edges of the blades. Thus, the inside-cutting edges 21 of the blade may be saved for finish-cutting.

The finish-cutting is effected when the cutter has attained full depth position. A dwell is allowed at full depth position long enough for the inside finishing blade to finish cut the convex sides of the teeth. No depth cutting is done, of course, during this dwell. This dwell, therefore, allows the sides of all the teeth to be finish-cut, then, under equal conditions; and the utmost in accuracy is, therefore, attainable. Moreover, due to the saving of the inside finish-cutting edges during the depthwise feed, these cutting edges remain sharp and suitable for effecting finishing cuts of the desired smoothness.

Further than this, the cutter 20 is rotated on its axis 22 so as to make an integral number of turns per feed cycle. The same blade will then make the final finishing cut on all of the sides of the teeth.

Figure 8:
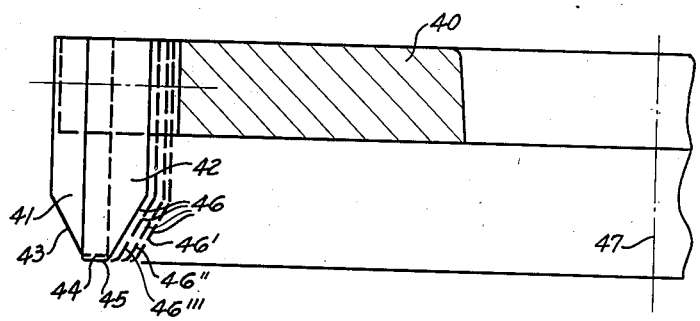
Fig. 8 is a fragmentary axial sectional view of a face mill cutter of positive pressure angle such as may be used in practicing this invention.

Still further, the final finishing edge and preferably, also, some of the preceding inside-cutting edges of cutter are positioned slightly radially inside of the cutting surface constituted by the other inside-cutting edges of the cutter, so that a still better finish and still greater accuracy may be achieved. A cutter 40 of this structure is shown somewhat diagrammatically in Fig. 8. It has a plurality of outside-cutting blades 41 and a plurality of inside cutting blades 42. In the case illustrated, the outside-cutting blades cut with their outside-cutting edges 43 only. The inside-cutting blades 42 are made slightly longer than the outside-cutting blades 41 so that their tips 45 project axially beyond the tips 44 of the outside-cutting blades. The inside blades 42 are intended to cut with their tip-cutting edges 45 as well as with their inside-cutting edges 46.

The outside-cutting edges 43 are preferably made to lie in the same cutting surface, which, if the cutting edges are, as shown, straight and of positive pressure angle, is a conical surface whose axis coincides with the axis 47 of the cutter. Several of the inside-cutting edges may lie in a common surface of revolution also coaxial with the axis 47 of the cutter and which, if the inside cutting edges are, as shown, straight and inclined to cutter axis 47, is a conical surface. The inside cutting edge 46' of one blade, at least, is, however, offset radially inwardly beyond the other inside cutting edges to constitute a finish-cutting edge. In the embodiment shown the two inside-cutting edges 46'' and 46''', which precede inside cutting edge 46', are also offset radially inwardly with reference to one another and with reference to the inside-cutting surface constituted by the inside-cutting edges of the majority of the inside-cutting blades. The inside-cutting edges 46''', 46'', and 46' are offset progressively from said inside-cutting surface, and they may be offset a half a thousandth or a thousandth of an inch progressively from one another and from the inside-cutting surface. The amount of offset in any event is quite small and is shown much exaggerated in the drawings for the purpose of illustration. The amount of offset is just large enough to enable the cutter to cut a chip without depthwise feed.

In operation, the cutter 40 is rotated on its axis 47 and fed depthwise into the work in a direction such as the direction 23 of Fig. 5 until full depth position is reached. During this depthwise feed, the bulk of the stock from the tooth spaces in which the cutter is operating is removed by the outside-cutting edges 43 and by the tip-cutting edges 44. The chips which are cut by the ordinary inside-cutting edges are quite thin being about one ninth of the thickness of the chips taken by the tip-cutting edges, as already described. Slightly thicker chips are cut by the offset inside-cutting edges 46''', 46'', and 46', for the chips which they cut are increased beyond the chips taken by the ordinary inside-cutting edges by the radial offset of the cutting edges 46''', 46'', and 46' with reference to the rest of the inside-cutting edges. The chips cut by these cutting edges are 0.001" thick if chips taken by the ordinary inside-cutting edges are 0.0005" thick and the radial offset of the cutting edges 46''', 46'', and 46' with reference to the ordinary inside-cutting edges is 0.0005".

The cutter rotation is so timed to the total feed cycle that full depth is reached prior to the cutting engagement of inside-cutting edges 46''', 46'', and 46'. The cutter is then allowed to dwell at full depth position until all of these cutting edges have taken their cut. In full depth position only these protruding edges 46''', 46'', and 46' do any cutting and the last edge 46' applies a fine finishing cut whose radial thickness equals the radial offset of edge 46' with reference to edge 46''. Due to the dwell, the final cut taken on all of the sides of the teeth of the work is the same and the utmost accuracy is, therefore, obtainable.

If desired, instead of having the inside-cutting blades protrude axially beyond the outside-cutting blades, both outside and inside blades may be made of the same height like any standard face mill gear cutter. Some of the inside-cutting blades can, then, be adjusted radially inwardly by shims or wedges to obtain the desired radial offset of the inside-cutting edges with reference to one another.

The tip-cutting edges 45 of the inside-cutting blades of cutter 40 all have the same axial position. If desired, however, the tip-cutting edges of those inside-cutting blades, which contain the inside-cutting edges 46''', 46'', and 46', might be made to extend progressively axially beyond one another. On the contrary, these blades might, also, be made of less height than the ordinary inside-cutting blades so that all danger of rubbing in the bottom of the tooth space, after full depth position is reached, will be avoided. Still further, the outside cutting blades adjacent the inside blades, whose edges are 46''', 46'', and 46', may be set inwardly with reference to the other outside-cutting blades so that they will not rub while the inside-cutting edges 46''', 46'', and 46' are in action. The two last described arrangements of the blades increase the accuracy of cutting.

While the invention has been described particularly in connection with the cutting of the member 10, it obviously applies to the cutting of either member of the clutch or coupling. Thus for cutting member 31, which is to engage member 10, and which has longitudinally concave sides on both sides of its teeth, a cutter 30 may be employed which has outside finish-cutting edges 32 and which is fed depthwise into the work in a direction 33 which is inclined to the work axis 16 in such way that during the depthwise feed the outside cutting edges of the cutter take only slight cuts, and stock is removed principally by the tip-cutting and inside-cutting edges of the cutter. The axis of the cutter is denoted at 34. The cutter is positioned to operate in two spaced tooth zones of the work simultaneously and after full depth position is reached, is allowed to dwell long enough for the outside-cutting edges to finish the longitudinally concave sides of spaced teeth of the work. In a manner similar to the cutter 40, the cutter 30 may have some of its outside cutting edges offset radially with reference to one another and with reference to the other outside cutting edges to increase the accuracy of cut.

Figure 6:
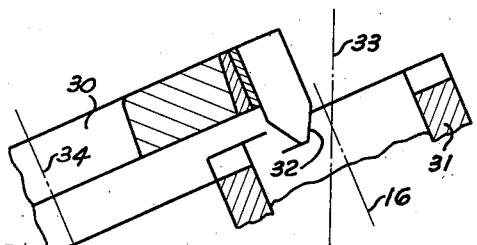
Fig. 6 is a similar view illustrating diagrammatically the cutting according to the invention of a clutch or coupling member having longitudinally concave tooth sides such as may mate with the member shown in Fig. 5.

The cutting method of the present invention may be performed on a standard Gleason spiral bevel and hypoid gear generator which is provided with a tilting adjustment of the cutter as, for instance, the No. 7A Gleason spiral bevel and hypoid gear generator. This machine has, of course, also, an angular adjustment for the work. In this machine, the depthwise feed movement is in the direction of the axis of the cradle. By adjusting the work, then, so that the work axis is inclined to the axis of the cradle and by tilting the cutter with reference to the cradle axis, feed can be obtained in the direction 23 of Fig. 5 or in the direction 33 of Fig. 6.

The invention is not limited to practice with a cutter having a single finish-cutting edge. Two or sometimes even more equi-angularly spaced finish-cutting edges may be provided in the cutter. When, for instance, two diametrically opposite finish-cutting edges are used, the cutter rotation may be timed so that the cutter performs either an integral number of turns per cutting cycle as already described or so that the cutter performs an integral but odd number of half revolutions per cutting cycle. For instance, it may turn two and a half or three and a half revolutions per cycle, in which case the corresponding sides of adjacent teeth of the coupling will be cut, respectively, by the diametrically opposite finish-cutting edges of the cutter. The diametrically opposite finish-cutting edges are, of course, precisely positioned at the same radial distance from the axis of the cutter.

Figure 7:
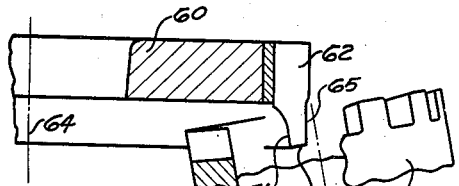
Fig. 7 is a view similar to Figs. 5 and 6, but showing the work partly in elevation, and illustrating diagrammatically the cutting of a clutch or coupling member of zero pressure angle according to one embodiment of this invention.

The invention is not limited to use in the cutting of toothed face members having positive pressure angles but may also be employed in the production of toothed face members of zero pressure angle. This is illustrated in Fig. 7. Here the work to be cut is a toothed face coupling or clutch member 50 whose opposite side tooth surfaces are of convex lengthwise shape. The cutter 60 employed in the cutting of this member has inside-cutting edges 61 of positive pressure angle. In fact, all of the blades are ordinarily made to be inside-cutting blades and are adapted to cut with their inside-cutting edges 61 and their tip-cutting edges 63. In operation, the work 50 is adjusted relative to the cutter 60 so that the work axis 51 is inclined to the axis 64 of the cutter, and the relative depthwise feed movement is produced in the direction of the axis of the cutter. In this way cutting by the outside edges 65 of the blades is avoided. These outside edges are of slightly negative pressure angle and lie in a conical surface coaxial with the cutter axis 64.

Figure 9:
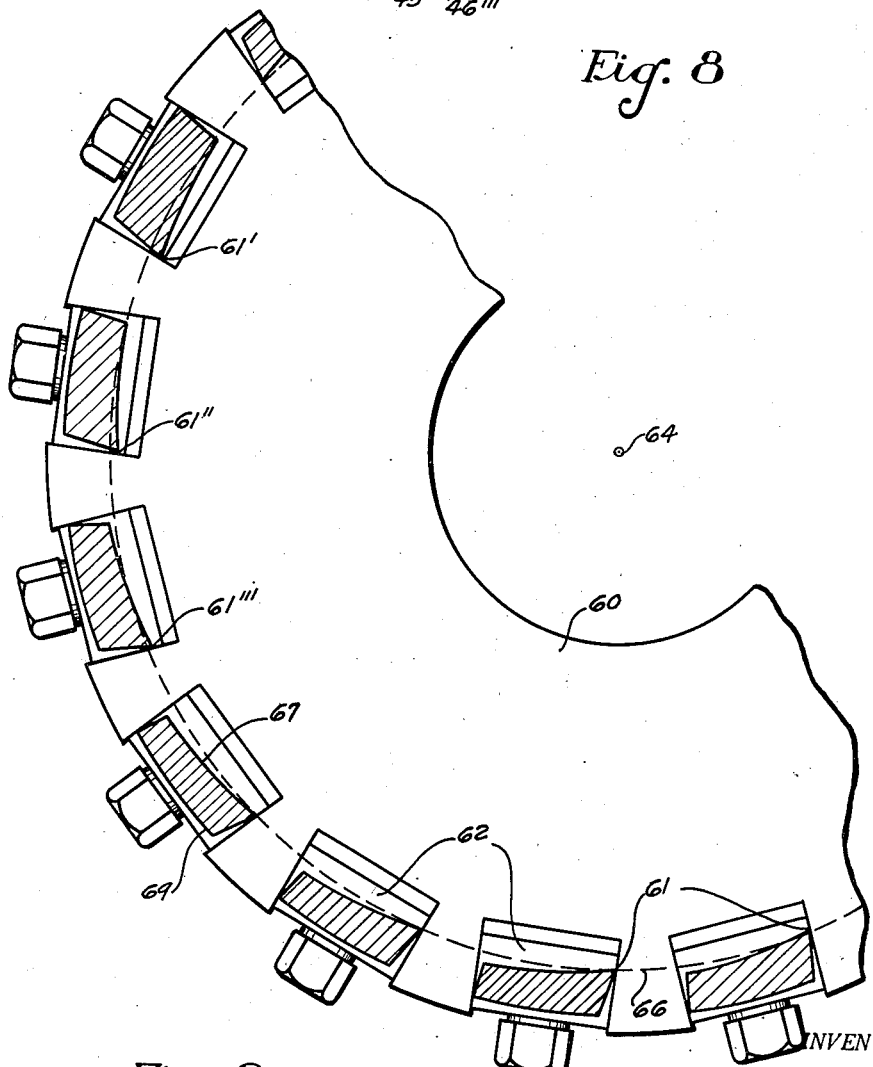
Fig. 9 is a fragmentary sectional view taken in a plane at right angles to its axis, and showing a similar cutter, but one whose side-cutting edges are of zero pressure angle.

A fragmentary section of the cutter 60 is shown on an enlarged scale in Fig. 9. The majority of the cutting blades 62 of this cutter are arranged so that their inside-cutting edges 61 lie in a conical surface 66 coaxial with cutter axis 64. The inside cutting edges 61''', 61'', and 61' of three of the blades are offset, however, by progressively greater small distances radially inside of this cutting surface 66 so that the inside-cutting edges 61'' and 61''', respectively, take slight chips after the cutter is in full depth position and the final finishing cut is applied by the inside-cutting edge 61' when the cutter dwells at full depth.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting a toothed face member which comprises employing a face mill cutter that has a plurality of inside, and a plurality of outside, and a plurality of tip-cutting edges, positioning said cutter in engagement with the work so that it will operate simultaneously in two spaced tooth zones of the work, rotating the cutter on its axis while effecting a relative depthwise feed movement between cutter and work in a direction inclined to the work axis in so as to cut during said depthwise feed principally with the tip-cutting edges and the cutting edges at one side of the cutter only, and allowing the cutter to dwell at full depth position long enough for a side-cutting edge of the cutter opposite the last named side-cutting edges to finish opposite sides of spaced teeth of the work, then withdrawing the cutter from engagement with the work, and indexing the work, the rotation of the cutter being timed to the cycle so that the cutter makes a predetermined number of revolutions per cycle and the same cutting edge takes the last finishing cut on the tooth sides of all the teeth of the work.

2. The method of cutting a toothed face member which comprises employing a face mill cutter that has a plurality of side-cutting edges at one side that are of positive pressure angle and a plurality of tip-cutting edges, positioning said cutter so that it will operate simultaneously in two spaced tooth zones of the work, rotating the cutter on its axis while effecting a relative depthwise feed movement between the cutter and the work in a direction inclined to the work axis at such an angle as to relieve said side-cutting edges to a large extent of cutting during the depthwise feed, and allowing the cutter to dwell in engagement with the work, after full depth position is reached, to allow said side-cutting edges to finish-cut the side tooth surfaces of the work, then withdrawing the cutter from engagement with the work and indexing the work, the rotation of the cutter being timed to the cycle so that the cutter makes a predetermined number of revolutions per cycle.

3. The method of cutting a toothed face member which comprises employing a face mill cutter that has a plurality of side-cutting edges at one side that are of positive pressure angle and a plurality of tip-cutting edges, positioning said cutter so that it will operate simultaneously in two spaced tooth zones of the work, rotating the cutter on its axis while effecting a relative depthwise feed movement between the cutter and the work in a direction parallel to the cutter axis and inclined to the work axis at an angle such as to relieve said side-cutting edges to a large extent of cutting during depthwise feed, and allowing the cutter to dwell in engagement with the work, after full depth position is reached, to allow said side-cutting edges to finish-cut the side tooth surfaces of the work, then withdrawing the cutter from engagement with the work and indexing the work, the rotation of the cutter being timed to the cycle so that the cutter makes a predetermined number of revolutions per cycle.

4. The method of cutting a toothed face member which comprises employing a face mill cutter that has a plurality of side-cutting edges at one side that are of positive pressure angle and a plurality of tip-cutting edges, one of said side-cutting edges being offset radially with reference to the other corresponding side-cutting edges to form a final finish cutting edge, positioning said cutter so that it will operate simultaneously in two spaced tooth zones of the work, rotating the cutter on its axis while effecting a relative depthwise feed movement between the cutter and the work in a direction inclined to the work axis at an angle to relieve said side-cutting edges to a large extent of cutting during the depthwise feed, and allowing the cutter to dwell in engagement with the work, after full depth position is reached, long enough for the finish-cutting edge to finish-cut opposite sides of spaced teeth of the work, then withdrawing the cutter from engagement with the work and indexing the work, the rotation of the cutter being timed to the cycle so that the cutter makes a predetermined number of revolutions per cycle.

5. The method of cutting a toothed face member which comprises employing a face mill cutter that has a plurality of side-cutting edges at both sides and tip-cutting edges, the side-cutting edges at both sides being of positive pressure angle, and certain of said side-cutting edges at one side being offset radially with reference to other side-cutting edges at that side and being offset progressively relative to one another, so that the final offset side-cutting edge is a finish-cutting edge, positioning said cutter so that it will operate simultaneously in two spaced tooth zones of the work, rotating the cutter on its axis while effecting a relative depthwise feed movement between the cutter and work in a direction inclined to the work axis at an angle to relieve the side-cutting edges at the finishing side to a large extent of cutting during the depthwise feed, and allowing the cutter to dwell in engagement with the work, after full depth position is reached, long enough for the finish-cutting edge to finish-cut opposite sides of spaced teeth of the work, then withdrawing the cutter from engagement with the work and indexing the work, the rotation of the cutter being timed to the cycle so that the cutter makes a predetermined number of revolutions per cycle.

ERNEST WILDHABER.

REFERENCES CITED

The following references are of record in the file of this patent:

UNITED STATES PATENTS

| Number | Name | Date |
| --- | --- | --- |
| 1,498,231 | Carter | June 17, 1924 |
| 2,125,943 | McMullen et al. | Aug. 9, 1938 |
| 2,334,366 | Wildhaber | Nov. 16, 1943 |
| 2,394,222 | Wildhaber | Feb. 5, 1946 |